United States Patent
Kalhan

(10) Patent No.: US 7,969,930 B2
(45) Date of Patent: *Jun. 28, 2011

(54) APPARATUS, SYSTEM AND METHOD FOR MANAGING WIRELESS LOCAL AREA NETWORK SERVICE BASED ON A LOCATION OF A MULTI-MODE PORTABLE COMMUNICATION DEVICE

(75) Inventor: Amit Kalhan, La Jolla, CA (US)

(73) Assignee: Kyocera Corporation, Kyoto (JP)

( * ) Notice: Subject to any disclaimer, the term of this patent is extended or adjusted under 35 U.S.C. 154(b) by 1186 days.

This patent is subject to a terminal disclaimer.

(21) Appl. No.: 11/565,383

(22) Filed: Nov. 30, 2006

(65) Prior Publication Data

US 2008/0130597 A1   Jun. 5, 2008

(51) Int. Cl.
*H04W 4/00* (2009.01)
*H04M 11/04* (2006.01)
*H04W 24/00* (2009.01)

(52) U.S. Cl. .............. 370/328; 370/338; 455/404.2; 455/456.1

(58) Field of Classification Search .... 455/404.1–404.2, 455/456.1–456, 552.1–553.15; 370/328–338
See application file for complete search history.

(56) References Cited

U.S. PATENT DOCUMENTS

| | | | |
|---|---|---|---|
| 4,737,978 A | 4/1988 | Burke et al. | |
| 5,208,756 A | 5/1993 | Song | |
| 5,293,645 A | 3/1994 | Sood | |
| 6,011,974 A | 1/2000 | Cedervall et al. | |
| 6,434,367 B1 | 8/2002 | Kumar et al. | |
| 6,965,585 B2 | 11/2005 | Grilli et al. | |
| 6,990,324 B2 | 1/2006 | Laroia et al. | |
| 7,050,819 B2 | 5/2006 | Schwengler et al. | |
| 7,167,712 B2 | 1/2007 | Ogino et al. | |
| 7,286,834 B2 | 10/2007 | Walter | |
| 7,433,673 B1* | 10/2008 | Everson et al. ............ 455/404.1 |
| 7,610,049 B2 | 10/2009 | Watanabe | |
| 2003/0118015 A1 | 6/2003 | Gunnarsson et al. | |
| 2004/0051664 A1 | 3/2004 | Frank | |
| 2004/0090937 A1 | 5/2004 | Chaskar et al. | |
| 2004/0116133 A1 | 6/2004 | Kalhan et al. | |
| 2004/0198220 A1 | 10/2004 | Whelan et al. | |

(Continued)

FOREIGN PATENT DOCUMENTS

EP     0504122     9/1992

(Continued)

OTHER PUBLICATIONS

Han, et al. "A Method to Support Femto-Macro Handover with Minimal Interference to the Macro Network" IP.com Journal Oct. 16, 2008, pp. 1-4, West Henrietta, NY US.

(Continued)

*Primary Examiner* — Simon D Nguyen

(57) ABSTRACT

A wireless access point monitors a wireless wide area network (WWAN) reverse link (RL) channel assigned to a multi-mode wireless communication device identified by a wireless wide area network (WWAN) as positioned proximate a geographical area at least partially including a wireless local area network (WLAN) service area of the access point. The access point sends a device proximity message to the WWAN based on a WWAN RL signal transmitted by the multi-mode wireless communication device and received at the access point. The device proximity message may indicate a request to perform a WLAN acquisition procedure to establish WLAN service from the access point.

23 Claims, 6 Drawing Sheets

U.S. PATENT DOCUMENTS

| | | |
|---|---|---|
| 2005/0059400 A1 | 3/2005 | Jagadeesan et al. |
| 2005/0090277 A1 | 4/2005 | Islam et al. |
| 2005/0197132 A1 | 9/2005 | Lee et al. |
| 2005/0232189 A1* | 10/2005 | Loushine ............... 370/328 |
| 2005/0237963 A1 | 10/2005 | Storm |
| 2005/0282494 A1* | 12/2005 | Kossi et al. ............ 455/41.2 |
| 2006/0025138 A1 | 2/2006 | Kotzin |
| 2006/0040656 A1 | 2/2006 | Kotzin |
| 2006/0056448 A1 | 3/2006 | Zaki et al. |
| 2006/0114885 A1* | 6/2006 | Baek et al. ............. 370/352 |
| 2006/0121916 A1 | 6/2006 | Aborn et al. |
| 2006/0268902 A1* | 11/2006 | Bonner .................. 370/401 |
| 2007/0002813 A1* | 1/2007 | Tenny et al. .......... 370/338 |
| 2007/0010261 A1 | 1/2007 | Dravida et al. |
| 2007/0021127 A1* | 1/2007 | Zheng .................. 455/456.1 |
| 2007/0049276 A1 | 3/2007 | Rimoni et al. |
| 2007/0104139 A1 | 5/2007 | Marinier et al. |
| 2007/0121560 A1* | 5/2007 | Edge ..................... 370/338 |
| 2007/0140190 A1* | 6/2007 | Rensburg et al. ..... 370/338 |
| 2007/0149211 A1* | 6/2007 | Dunn et al. ........... 455/456.1 |
| 2007/0177530 A1* | 8/2007 | Ando et al. ........... 370/277 |
| 2007/0184845 A1* | 8/2007 | Troncoso ............... 455/456.1 |
| 2007/0254620 A1 | 11/2007 | Lindqvist et al. |
| 2008/0130555 A1 | 6/2008 | Kalhan |
| 2008/0130596 A1 | 6/2008 | Kalhan |
| 2008/0130598 A1 | 6/2008 | Kalhan |
| 2008/0153497 A1 | 6/2008 | Kalhan |
| 2008/0261615 A1* | 10/2008 | Kalhan ................... 455/456.1 |
| 2008/0311927 A1* | 12/2008 | Boman et al. .......... 455/456.1 |
| 2009/0213819 A1 | 8/2009 | Kalhan |
| 2009/0215400 A1 | 8/2009 | Chang et al. |

FOREIGN PATENT DOCUMENTS

| | | |
|---|---|---|
| EP | 1816888 | 8/2007 |
| EP | 1986341 | 10/2008 |
| JP | 07-154848 | 6/1995 |
| JP | 2005-110314 | 4/2005 |
| WO | WO 98/19474 | 5/1998 |
| WO | WO 02/054820 A2 | 7/2002 |
| WO | WO 2004/002051 | 12/2003 |
| WO | WO 2004/054153 | 6/2004 |
| WO | WO 2004/057815 | 7/2004 |
| WO | WO 2004/084463 A2 | 9/2004 |
| WO | WO 2005/076639 | 8/2005 |
| WO | WO 2007/064822 | 6/2007 |
| WO | WO 2008/066926 | 6/2008 |
| WO | WO 2008/066927 | 6/2008 |
| WO | WO 2008/066928 | 6/2008 |
| WO | WO 2008/066929 | 6/2008 |
| WO | WO 2008/091412 | 7/2008 |
| WO | WO 2009/067700 | 5/2009 |

OTHER PUBLICATIONS

Carstens, Juergen, "A Method for Interference Control and Power Saving for Home Access Point", IP.Com Journal, Dec. 13, 2007, pp. 1-3, West Henrietta, NY US.

Alejandro R. Holman and Edward G. Tiedemann Jr., "CDMA Intersystem Operations", 1994 IEEE 44th Vehicular Technology Conference, Jun. 8, 1994. pp. 590-594, Stockholm Sweden.

\* cited by examiner

APPARATUS, SYSTEM AND METHOD FOR MANAGING WIRELESS LOCAL AREA NETWORK SERVICE BASED ON A LOCATION OF A MULTI-MODE PORTABLE COMMUNICATION DEVICE

RELATED APPLICATIONS

This application is related to U.S. patent application entitled "APPARATUS, SYSTEM AND METHOD FOR MANAGING WIRELESS LOCAL AREA NETWORK SERVICE TO A MULTI-MODE PORTABLE COMMUNICATION DEVICE", Ser. No. 11/656,266, U.S. patent application entitled "DETECTION OF A MULTI-MODE PORTABLE COMMUNICATION DEVICE AT A MESH NETWORK", Ser. No. 11/565,323, and U.S. patent application entitled "MANAGEMENT OF WLAN AND WWAN COMMUNICATION SERVICES TO A MULTI-MODE WIRELESS COMMUNICATION DEVICE", Ser. No. 11/565,419, all filed concurrently with this application and all incorporated by reference in their entirety, herein.

TECHNICAL FIELD

The invention relates in general to wireless communication systems and more specifically to managing wireless local area network (WLAN) services to multi-mode portable communication devices based on device location.

BACKGROUND

Wireless local area networks (WLANs) and wireless wide area networks (WWANs) provide wireless communication services to portable devices where the WLANs typically provide services within geographical service areas that are smaller than the geographical areas serviced by WWANs. Examples of WWANs include systems that operate in accordance with 2.5G (such as cdma2000), 3G (such as UMTS, WiMax), and other types of technologies, where each base station of the WWAN is typically designed to cover a service area having a size measured in miles. The term WWAN is used primarily to distinguish this group of diverse technologies from WLANs that typically have smaller service areas on the order of 100 to 300 feet per base station. Base stations in WLANs are typically referred to as access points. An access point may be connected to the Internet, intranet, or other network through wires or wirelessly through a WWAN. Examples of WLANs include systems using technologies such as Wi-Fi and other wireless protocols in accordance with IEEE 802.11 standards. WLANs typically provide higher bandwidth services than WWANs at the expense of non-ubiquitous coverage whereas WWANs provide increased coverage areas at the cost of bandwidth and/or capacity. In order to provide a wireless user with the increased overall performance and continuous connectivity, multi-mode mode and dual-mode portable communication devices have been developed allowing the communication device to access the particular type of network that provides the most desirable tradeoffs. A multi-mode wireless communication device includes the appropriate components and functionality for communicating within more than one network. For example, a dual-mode portable communication device can communicate within a WWAN and a WLAN.

Unfortunately, conventional techniques for managing the connection status between the portable communication device and the access point are limited in that they include inefficient searching mechanisms executed by the portable communication device in order to establish service with a new network for performing a handoff between networks. For example, some conventional systems require the mobile communication device to periodically tune to an alternate network channel in an attempt to detect an alternate network resulting in significant power consumption with a limited success rate of detecting alternate networks.

Accordingly, there is a need for an apparatus, system, and method for managing WLAN service to a multi-mode portable communication device.

SUMMARY

A wireless access point monitors a wireless wide area network (WWAN) reverse link (RL) channel assigned to a multi-mode wireless communication device identified by a wireless wide area network (WWAN) as positioned within or proximate a geographical area at least partially including a wireless local area network (WLAN) service area of the access point. The access point sends a device proximity message to the WWAN based on a WWAN RL signal transmitted by the multi-mode wireless communication device and received at the access point. The device proximity message may indicate a request to perform a WLAN acquisition procedure to establish WLAN service from the access point.

DETAILED DESCRIPTION

Figure 1:
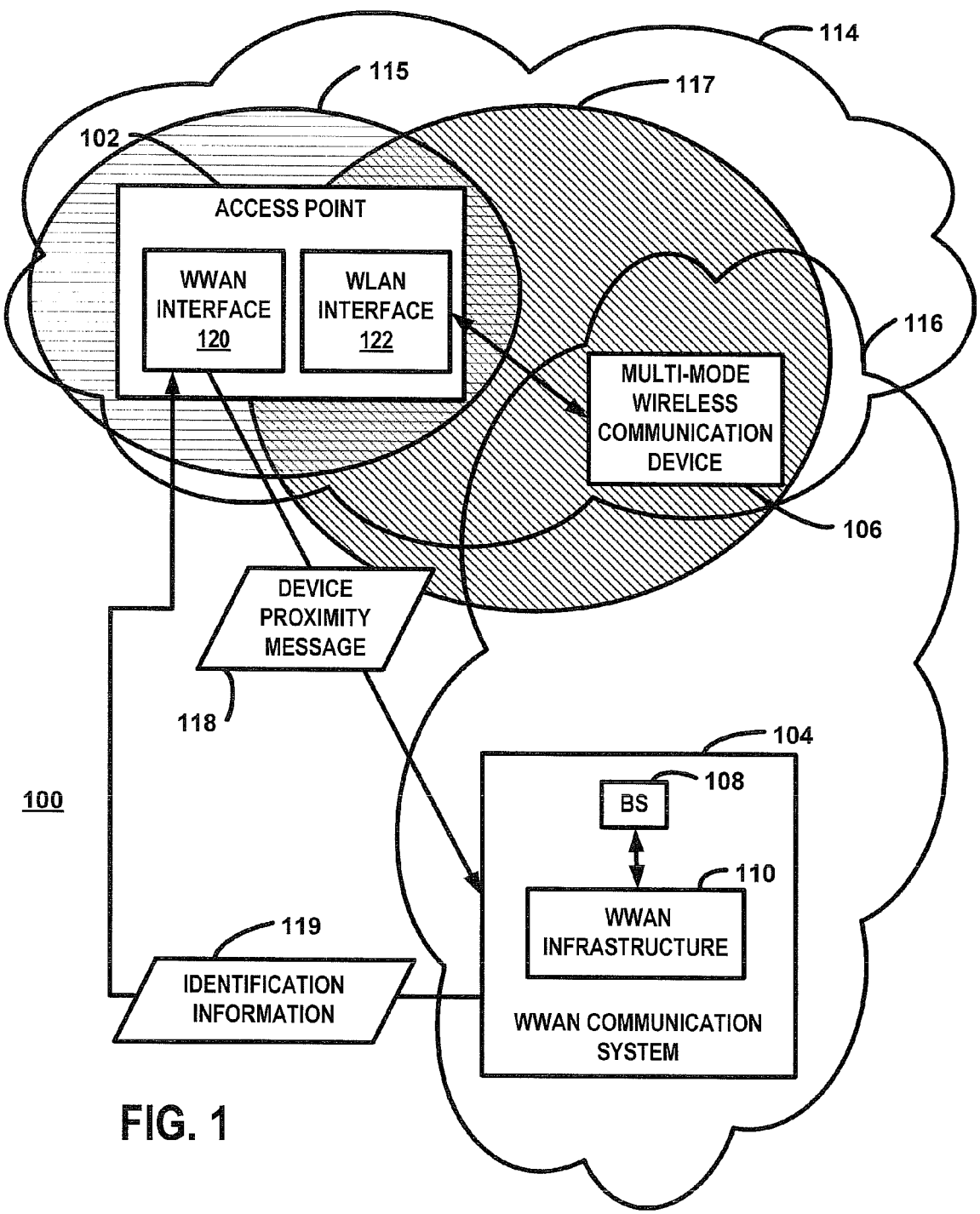
FIG. 1 is a block diagram of a communication network arrangement in accordance with the exemplary embodiment of the invention.

FIG. 1 is a block diagram of an access point 102 within a communication network arrangement 100 in accordance with the exemplary embodiment of the invention. The access point 102 communicates with a wireless wide area network (WWAN) communication system 104 and provides wireless local area network (WLAN) service to one or more multi-mode wireless communication devices 106. As described above, the term WWAN is used primarily to distinguish this group of diverse technologies from WLANs that typically have smaller service areas on the order of 100 to 300 feet per base station (access point). Accordingly, the WWAN communication system 104 is any system that provides wireless communication services within relatively large geographical areas as compared to WLANs. Examples of WWAN systems 104 include cellular communication systems that provide cellular communication services through at least one base station 108 connected to a WWAN infrastructure 110 such as a cellular system infrastructure (110). The WWAN infrastructure 110 may include one or more core networks that are connected to a global network such as Internet Protocol (IP) network or public switched telephone network (PSTN). In the exemplary embodiment, the WWAN communication system 104 operates using packet switching communication techniques. In such systems, the communication infrastructure is a packet switched core network and includes an access gateway for interfacing to WLANs using IP signaling. The WWAN communication system 104, however, may operate in accordance with circuit switched communications in some circumstances. The WWAN communication system 104 may operate using any of numerous protocols and schemes. Examples of some Code Division Multiple Access (CDMA) standards include cdma2000 1X, 1xEV-DO, and W-CDMA. In some circumstances, the WWAN communication system 104 may operate with other standards such as OFDM based standards or GSM standards, for example. In the embodiment discussed below, the WWAN system 106 is an OFDM system that operates in accordance with IEEE 802.16(e) standards often referred to as WiMax. The various functions and operations of the blocks described with reference to the WWAN communication system 104 may be implemented in any number of devices, circuits, or elements. Two or more of the functional blocks may be integrated in a single device and the functions described as performed in any single device may be implemented over several devices. For example, at least portions of the functions of the WWAN infrastructure 110 may be performed by the base station 108, a base station controller, or the MSC in some circumstances.

The access point 102 is any device capable of providing wireless local area network (WLAN) services and that can send messages to the WWAN communication system 104. Although the access point 102 is a fixed access point that is connected through a wired backhaul to an IP network in the exemplary embodiment, the access point 102 may be a cellular mobile gateway that is connected through a cellular communication link, or other WWAN link, to a WWAN. The access point 102 provides WLAN service to communication devices 108 within adequate range of the access point 102. An example of suitable technique for providing WLAN service includes operation in accordance with a WLAN protocol such as WiFi or any of the protocols defined in the IEEE 802.11 standards. Messages sent from the access point 102 to the WWAN infrastructure 110 may be sent using any combination of wired and/or wireless communication methods. In the exemplary embodiment, the access point 102 is connected to an access gateway in a core network and sends messages using packet switched data techniques, either through an IP network or through an access router. In some circumstances, messages can be sent from the access point 102 through a PSTN. In other circumstances, a transmitter may be used to wirelessly transmit the messages to the base station 108 which are then forwarded to the WWAN infrastructure 110.

The multi-mode wireless communication device 106 is any type of communication device that is capable of communicating with at least one WLAN system and at least one WWAN system 104. The multi-mode wireless communication device 106, sometimes referred to as an access terminal, may be a wireless modem, a personal digital assistant, dual mode cellular telephone, or other such device.

Accordingly, the access point 102 facilitates communication to a WLAN 114 and the WWAN communication system 104 facilitates communication to a WWAN 116, where the communication device 106 is capable of communicating on both of the networks 114, 116. The communication device 106 can access wireless services provided by either of the networks 114, 116 when resources are available on the particular network and signal quality is adequate. In the exemplary embodiment, the communication device 106 may access both networks 114, 116 simultaneously under certain conditions. In some circumstances, however, the communication device 106 may be able only to access one of the networks 114, 116 at any given time. In another scenarios, the communication device 106 may be able to access only control channels of the network 116 but have full access of network 114 or vice versa. Each access point provides WLAN service within a WLAN service area 115. The clouds (114, 116) shown in FIG. 1 symbolize networks and do not necessarily illustrate coverage areas of the networks 114, 116. For example, the geographical coverage area of the WWAN 116 may include one or more WLAN coverage areas 115 provided by access points 102. Further, the coverage area of the WWAN 116 may have poor quality areas or areas where no WWAN service is available. These areas, however, may have good coverage from a WLAN 114. Such a scenario may occur where the WLAN coverage is within a building such as an office or home and the WWAN coverage is generally available in the area of the building but lacking within the building due to walls and other signal obstructions. In addition to other advantages, managing wireless services in accordance with the exemplary embodiments maximizes the quality of the wireless services provided to the communication devices 106.

In accordance with the exemplary embodiment, the access point 102 monitors WWAN RL channels assigned to communication device 106 identified by the WWAN communication system 104 as being positioned within or proximate a geographical area 117 that includes at least a portion of the WLAN service area 115. Based on a received WWAN RL signal transmitted by the local device 106, the access point sends a device proximity message 118 to the WWAN communication system 104. In the exemplary embodiment, the device proximity message 118 is a request message requesting the execution of a WLAN acquisition procedure. In response to the device proximity message 118, the WWAN infrastructure 110 sends a message to the communication device 106 instructing the communication device 106 to search for WLAN wireless service or to establish wireless service from an access point 102. In some situations, the WWAN infrastructure 110 may evaluate other parameters before instructing the communication device 106. For example, due to subscriber parameters, system settings, or system parameters, the WWAN infrastructure may determine that the communication device 106 should not acquire an alternate network. Further, the WWAN system 104 may evaluate parameters corresponding to multiple access points where device proximity messages identifying a particular communication device 106 are received from more than one access point.

In the exemplary embodiment, identification information 119 is sent from the WWAN communication system 104 to the access point 102. The identification information 119 identifies the one or more communication devices 106 as local communication devices that are within the geographical area 117. The access point 102 searches for those local communication devices 106 by monitoring the RL WWAN channels. The geographical area 117 may have any of numerous shapes and sizes and in some cases, may coincide with a WLAN service area 115 of an access point 102. Further the geographical area 117 may include any number of WLAN services areas 115 provided by any number of access points 102. The geographical area 117 may depend on the method of acquiring location information that indicates the geographical locations of the communication devices 106. For example, where the location information is derived by identifying a base station or a base station sector that is providing WWAN service to the communication device 106, the geographical coverage area 117 is based on a base station sector coverage area or base station sector coverage area. Where the location information is obtained by information sent by the communication device 106, the geographical area 117 is determined based on the location information provided. For example, if the communication device 106 provides location information derived from global positioning system (GPS) coordinates obtained by the communication device 106, the geographical area 117 may include a circle having the location of the communication device 106 as the center. Other techniques may be used by the WWAN system 104 to determine the geographical area 117 that contains the communication device 106. For example, antenna beam forming, smart antenna, or triangulation techniques may be used to estimate the geographical area 117 containing a communication device 106.

The WWAN communication system 104 applies the geographical area 117 to access point 106 locations to determine which access points 106 include, or may include, WLAN service areas 115 that at least are partially within the geographical area 117. Access point locations are maintained in memory (not shown in FIG. 1) and may be periodically updated.

After receiving the device proximity message 118 from an access point 106 at least indicating that the local communication device is within a maximum proximity, the WWAN communication system 104 at least performs an evaluation in response to the device proximity message 118. The WWAN system 104 may perform or initiate the acquisition of the WLAN service to the communication device 106 in response to the device proximity message 108. The acquisition may result in a handoff of the communication device 106 from the WWAN 116 to the WLAN 114 in some circumstances or may result in the communication device 106 receiving wireless service from two networks simultaneously. Further, the communication device 106 may maintain registration with the WWAN 116 although user data is only exchanged on the WLAN 114. In the exemplary embodiment, the device proximity message 118 is sent through either an IP network or an access router to an access gateway in the WWAN. In some circumstances, however, the device proximity message 118 is sent through a wireless link. For example, the message could be sent as a reverse link WWAN signal where the access point 102 includes a WWAN transmitter. In the exemplary embodiment, the identification information 117 is sent through either an IP network or an access router by an access gateway in the WWAN. In some circumstances, however, the identification information 117 is sent through a wireless link. For example, the message 117 could be sent as a forward link WWAN signal.

When the WWAN communication system 104 is providing wireless communication services to the communication device 106, the access point 102, at least periodically, monitors the WWAN reverse link channel used by the communication device 106 to transmit WWAN reverse link signals. In some cases, the access point 102 may employ procedures to detect multiple multi-mode communication devices 106. Based on the WWAN reverse link signal received at the access point 102, the access point 102 determines if the communication device 106 should at least search for WLAN service. In some circumstances, the access point 102 determines that the communication device 106 should provide WLAN communication service to the communication device 106. When the WLAN determines that the communication device 106 is within range of the access point 102, the access point 102 transmits the device proximity message 118 to the WWAN communication system 104 indicating that the communication device 106 is likely within the service area of the WLAN network 114. The WWAN system 104 then performs the alternate network acquisition procedure which may include an instruction for the communication device 106 to search for WLAN service, to search for a particular access point 102, and/or to acquire WLAN service. As described in further detail below, an example of a situation where the above scenario applies includes the situation where a communication device 106 is approaching the access point 102 while receiving communication services from a WWAN.

In addition to managing wireless service as described above, the access point 106 may perform other monitoring and management procedures. For example, when the access point 102 is providing wireless communication services to the communication device 106, the communication device 106, at least periodically, monitors the WWAN forward link signals and transmits a status message to the access point 102. The forward link signals may include control signals and pilot signals as well as other information. Based on the WWAN forward link signal received at the communication device 106, the access point 102 determines if the WWAN communication system 104 should provide WLAN communication service to the communication device 106. When the WLAN determines that WWAN service should be provided or should be evaluated, the access point 102 transmits the device proximity message 118 to the WWAN communication system 104 to alert the WWAN system 104 of the potential for acquisition of the WWAN service or a handoff to WWAN service. As described in further detail below, an example of a situation where this scenario applies includes the situation where communication device 106 is traveling away from the access point 102 while receiving communication services form the access point 102. The access point 102 at least performs some decision making based on a WWAN FL signal received at the communication device 106 that acquisition of the WWAN service may be desired.

In some situations, the access point 102 may monitor the WWAN forward link signals using a WWAN FL receiver and send a message to the WWAN 110 if the access point 102 determines that the communication device 106 should be handed-off to WWAN service. For example, if the access point 102 detects that communication device 106 is leaving the WLAN service area or that the quality of the WLAN service is otherwise decreasing, the access point 102 verifies that WWAN service is adequate by measuring the power of the WWAN FL signals. Although it is possible that the WWAN service may not be adequate at the communication device 106 location, this technique provides increased efficiency by not requiring the communication device to continually monitor WWAN service when communicating on the WLAN.

A WWAN interface 120 includes any combination of hardware, software and/or firmware adequate to at least detect WWAN RL signals and to send the device proximity message 118 to the WWAN system 104. As described below in further detail, the WWAN interface 120 is connected through a network interface to an access router and an IP network. The device proximity message 118 is transmitted through the network interface to WWAN infrastructure 110. In the exemplary embodiment, the WWAN interface also includes a WWAN FL receiver for receiving WWAN FL signals. In some circumstances the WWAN interface 120 may also include a WWAN transmitter.

A WLAN interface 122 includes any combination of hardware, software and/or firmware for communicating with one or more communication devices 102. As discussed below, the WLAN interface 122 includes a WLAN transmitter and a WLAN receiver.

Figure 2:
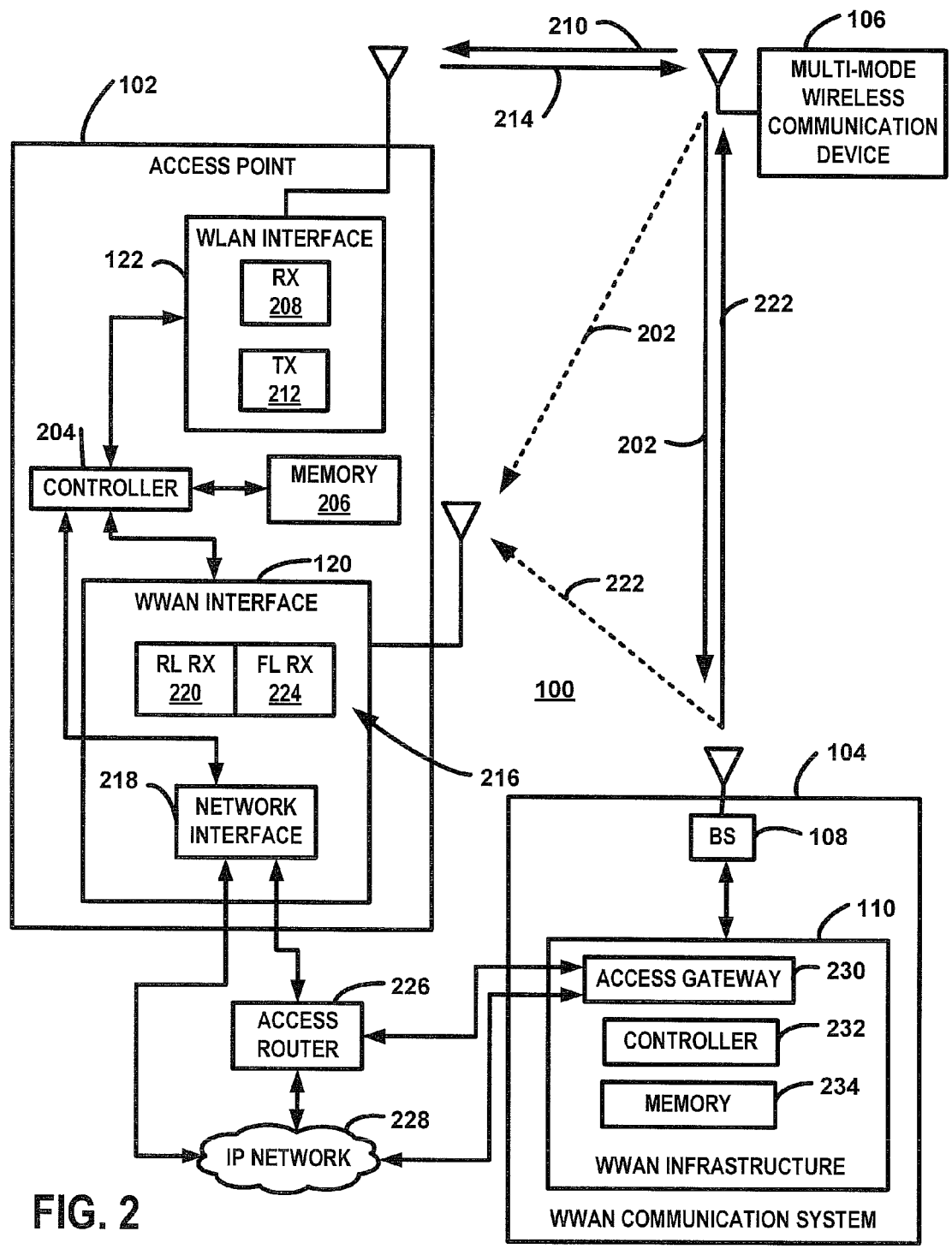
FIG. 2 is a block diagram of the communication network arrangement where the access point receives reverse link WWAN signals from the communication device.

FIG. 2 is a block diagram of the communication network arrangement 100 where the access point 102 receives reverse link (RL) WWAN signals 202 from the communication device 106. The access point 102 includes the WWAN interface 120 for communicating with the WWAN system 106 and the WLAN interface 122 for providing WLAN service to one or more communication devices such as the multi-mode wireless communication device 106. The access point 102 further comprises a controller 204 coupled to the WWAN interface 110 and the WLAN interface 122. The controller 204 performs the control functions described herein as well as performing other functions and facilitating the overall operation of the access point 102. The controller 204 is connected to, or includes, a memory 206 that may include one or more random access memory (RAM) and/or read only memory (ROM) memory devices. The WLAN interface 122 includes a WLAN receiver 208 for receiving reverse link (RL) WLAN signals 210 and a WLAN transmitter 212 for transmitting WLAN signals 214. The signals 210, 212 are transmitted and received in accordance with a WLAN protocol. Examples of a suitable WLAN protocols include protocols in accordance with the IEEE 802.11 protocol and wireless fidelity (WiFi). In some circumstances, the access point 102 may also include a wired LAN interface (not shown) for communicating with devices connected to the access point 102 through wires.

The WWAN interface 120 includes a WWAN receiver 216 that can be configured to at least receive reverse link WWAN signals 202 transmitted from a multi-mode wireless communication device 106. The WWAN interface 120 is also configured to send the device proximity message 118 to the WWAN infrastructure 110 through a network interface 218 and to receive the identification information 119 through network interface 218. In the exemplary embodiment, the WWAN receiver 216 can be configured as a reverse link WWAN receiver 220 for receiving reverse link WWAN signals 202 and as a forward link WWAN receiver 224 for receiving WWAN forward link signals 222 from a base station 108. In some circumstances, two separate WWAN receivers may be used to implement the WWAN reverse link and forward link receivers 220, 224. Also, in some implementations, the capability to receive WWAN forward link signals 222 may be omitted.

The network interface 218 exchanges messages with an access router 226 and an internet protocol (IP) network 228. The network interface 218 provides packet data communications and facilitates access to the Internet and to an access gateway 230 in the WWAN infrastructure 110 through the access router 226. In some circumstances, at least portions of the network interface 218 may be implemented separately from the WWAN interface 120. The access router 226 may be connected to several access points 102 and provides communication management and control functions to the WLAN. In some situations, the access router 226 may be implemented within an access point 102 or may be eliminated. In some circumstances the connection between the access gateway 230 and the access point 102 may include a wireless communication link such as satellite communication link or point-to-point microwave link, for example.

In addition to other information, the memory 206 stores communication device identification values corresponding to each communication device 106 that is authorized to use the access point 102. The communication device identification value may include an electronic serial number (ESN) or other unique data. An example of a group of identification values stored in memory includes a collection of ESNs corresponding to the communication devices of the family members of a household where the access point 102 provides WLAN service. The identification values may be stored at the access point 102 using any of numerous techniques. An example of a suitable method of storing the values includes storing the values during an initialization procedure performed when the access point 102 is installed. In the exemplary embodiment, the identification information 119 received from the WWAN system 104 includes identification values identifying the local communication devices 106 that may be near the access point 106. Accordingly, the identification information 119 allows the access points to update the user list of devices that will be monitored. In some implementations, only identification values that are received from the WWAN system 104 are stored in the user list. In other situations, the user list may include a combination of identification values that are pre-programmed and values that are received from the WWAN system 104. The identification information 119 may include any combination of parameters, numbers, identifiers or information that provide the access point with adequate data for identifying the particular communication device 106.

The access point 102 monitors the reverse link WWAN channel(s) that may contain a reverse link WWAN signal 202 transmitted from a communication device 106 that is not currently receiving WLAN service from the access point 102. The reverse link WWAN receiver 220 is tuned, or otherwise configured, to receive the reverse link WWAN signals 202. Based on one or more received WWAN RL signals 202, the controller 204 determines the proximity of the communication device 106 to the access point 102. An example of suitable technique for determining the proximity includes evaluating a power level of the received RL WWAN signal. In some circumstances, the detection of a RL WWAN signal from the communication device 106 may be sufficient to determine that the communication device 106 is within a proximity range. In the exemplary embodiment, the proximity is used to determine whether the communication device 106 is possibly within range of the access point 102 and possibly able to receive WLAN service. Therefore, the controller 204 at least determines whether the communication device is possibly within WLAN range of the access point 102. The controller 204 may determine whether to generate and send the device proximity message 118 based on factors other than power level of the signal. For example, factors may include only the power level of the WWAN RL signal or on a factor based solely on the WWAN RL receiver's 220 ability to decode the incoming RL signal. The device proximity message 118 initiates an alternate network acquisition procedure that may result in an attempt by the communication device 106 to acquire wireless service from the access point 102 in the exemplary embodiment. The determination to generate the device proximity message 118, therefore, may be based on other criteria in addition to the proximity. Any of numerous criteria may be used to determine if WLAN service should be acquired where the criteria may include conditions related to the capacity of the access point 102 and/or the requirements of the communication device 106. The controller 204 uses the WWAN RL signal to determine if the communication device 106 is possibly within the service area of the access point 102. The criteria used to determine whether the communication device 106 is within the service area of the access point 102 depends on the type of WWAN.

Any of several techniques may be used to determine the proximity of the communication device 106 based on the WWAN RL signal. In the exemplary embodiment discussed below in further detail, reverse link scheduling information is received from the WWAN system 104 through the network interface 218. In some implementations, a forward link WWAN signal transmitted from the base station to the communication device 106 is intercepted by the access point 102 and decoded to determine reverse link scheduling information. Based on the difference in received power and transmitted power of the WWAN RL signal, the access point 102 determines the distance. The access point 102 may also determine distance based on the difference between the arrival time and transmission time of the WWAN RL signal. In another example, the access point 102 may determine that the communication device 106 sufficiently close to generate the device proximity message 118 if the received power level is above a threshold without information regarding the transmission power level. Another example of a suitable technique of determining proximity includes utilizing multiple antennas or smart antennas to determine the proximity of the communication device 106 to the access point 102 based on the reverse link WWAN signal transmitted by the communication device 106. For example, beam forming antennas may provide distance information to allow the controller to determine whether the communication device 106 is within the WLAN service area. Other techniques or combinations or techniques may be used.

In the exemplary embodiment, the WWAN infrastructure 110 comprises a packet switched core network that includes at least one access gateway 230. A controller 232 includes a processor, computer, processor arrangement, or other processing device where at least some functions of the access gateway may be performed by the controller 232. In the exemplary embodiment, the controller includes a Position Determination Entity (PDE) and/or other location determining processors such as Location Server. A memory 234 includes any suitable memory device such as RAM or ROM that provides electronic storage of information. In addition to other types of information, the memory stores information regarding identification information 119 and access point 102 locations. The access router 226 may be connected to the access gateway 230 using any combination of wired and wireless connections. Examples of suitable connections include T1 lines, fiber optic cable, coaxial cable, and point-to-point microwave. The access gateway 230 is a communication interface that allows the access point 102 to communicate with the WWAN infrastructure. The various components and functions of the WWAN infrastructure may be implemented using several devices dispersed throughout the core network. For example, the processing functions for determining relative position of an access point may be implemented in a server that is connected to a PDE located in different location.

During operation, the WWAN system 104 determines the location of multi-mode wireless communication devices 106 that are within one or more geographical areas 117. Based on location information, the controller 232 determines the geographical area 117 associated with each multi-mode communication device 106. The location information may be obtained from a message sent from the communication device 106. For example, GPS information determined by the communication device 106 is sent to the base station. Such a message may be sent when the communication device enters a new service area such as during a handoff. Further, the location information may be determined by the controller 232 based on the base station and/or the sector that is used for communication with the communication device 106. In the exemplary embodiment, the location information includes information provided by the communication device and location information calculated by the controller 232. Other techniques may also be used in some situations. The controller 232 uses the location information to determine the geographical area 117 and the access points that have WLAN service areas that at least partially fall within the geographical area 117. For example, a process may be invoked that calculates the GPS coordinates of the access points that are within a mathematical representation of the shape defining the geographical area 117 to determine the access points 102 that may have WLAN service areas 115 that at least partially overlap with the shape of the geographical area 117. The criteria for determining whether a particular access point is identified as corresponding to a particular geographical area may include other factors or parameters. The identification information 119 corresponding to the communication device 106 within the geographical area 117 is sent to the identified access points 102. In the exemplary embodiment, the access gateway 230 sends a packet switched messaged to the identified access points 102 which update the respective user lists using the identification information 119. In some cases, the identification information 119 may be transmitted wirelessly to the access point 102. The WWAN system 104 also transmits reverse link scheduling information associated with each of the identified communication devices 106. The reverse link scheduling information includes frequency and timing information. The frequency information may include carrier frequencies, a sub-band frequency, sub-carrier frequencies, and/or a set of tones. Timing information may include time slot information as well as synchronization information to provide the access point 102 with a timing reference.

In the exemplary embodiment where the WWAN system is an OFDMA system, communication device transmission power level is the same for each communication device unless adjusted by the OFDMA system. During system initialization of the access points, the default power level is stored in memory 206. Any adjustments to the transmission power level for a particular communication device 106 are forwarded to the access point 102 and updated in memory 206. In some circumstances, transmission power level updates may not be available and the access point uses the default values for proximity calculations. The access point determines the proximity or a proximity estimate based on the measured propagation loss of the transmitted reverse link signal and propagation time. In some situations, a combination of propagation time, propagation loss, and other parameters may be used to determine the proximity.

After determining the proximity of the communication device 106 to the access point 102, the controller 202 determines whether the access point 102 should provide WLAN service to the communication device 106. If the controller 202 determines that the access point 102 should provide WLAN service to the communication device 106, the controller 202 generates a device proximity message 118. The message 118 is sent to the WWAN communication system 104 either through the access router 226 or through the IP network 228.

The device proximity message 118 includes at least information identifying the communication device 106 that results in an interpretation by the WWAN infrastructure 110 that WLAN service may be available to the communication device. The device proximity message 118, however, may include additional information such, for example, information identifying the access point 102, the calculated or estimated proximity of the communication device 106 to the access point 102, and available capacity on the access point 102. Access point identification information may include a SSID of the access point 102. Further, the device proximity message 118 may contain security protocol that assists the core network in identifying the access point 102. The WWAN infrastructure may perform additional analysis to determine what instructions, if any, will be sent to the communication device. In some situations, the WWAN infrastructure (core network) 110 sends an instruction to the communication device 106 indicating that the communication device 106 should search for a WLAN system. In response to the instruction, the communication device 106 activates and tunes the WLAN interface 122 to search for a WLAN signal in accordance with known techniques. In other situations, the WWAN infrastructure (core network) 110 sends an instruction to the communication device 106 indicating that the communication device 106 should search for the specific access point 102 that sent the device proximity message 118. In other situations, the WWAN infrastructure (core network) 110 may instruct the communication device 106 to acquire WLAN service.

Therefore, the WWAN system 104 identifies communication devices 106 that may be within range of one or more access points 102 based on location information that is provided by the communication device and/or calculated by the WWAN system 104. The WWAN system 104 applies access point location information to the communication device location information to identify access points that have some probability of providing service to one or more communication devices. Identification information 119 is sent through an access gateway to the appropriate access points, where the identification information 119 allows the access point to identify the communication devices. Reverse link scheduling information is also provided by the WWAN system 104 allowing the access point 102 to more efficiently monitor the reverse ink signals transmitted by the identified communication devices. The access points 102 update the respective user lists using the identification information and reverse link scheduling information and monitor the WWAN RL signals. Based on the WWAN RL signals, access point identifies communication devices that may be within range of the access point 102. The access point send a device proximity message to the WWAN system 104 identifying a communication device that may be within range of the access point. The WWAN system 104 processes the information received from the access point(s) and determines whether any communication devices should attempt to acquire WLAN service. The WWAN system 104 sends appropriate instructions to the communication device(s) to acquire WLAN service, to handoff to an access point, or to search for WLAN service.

Figure 3:
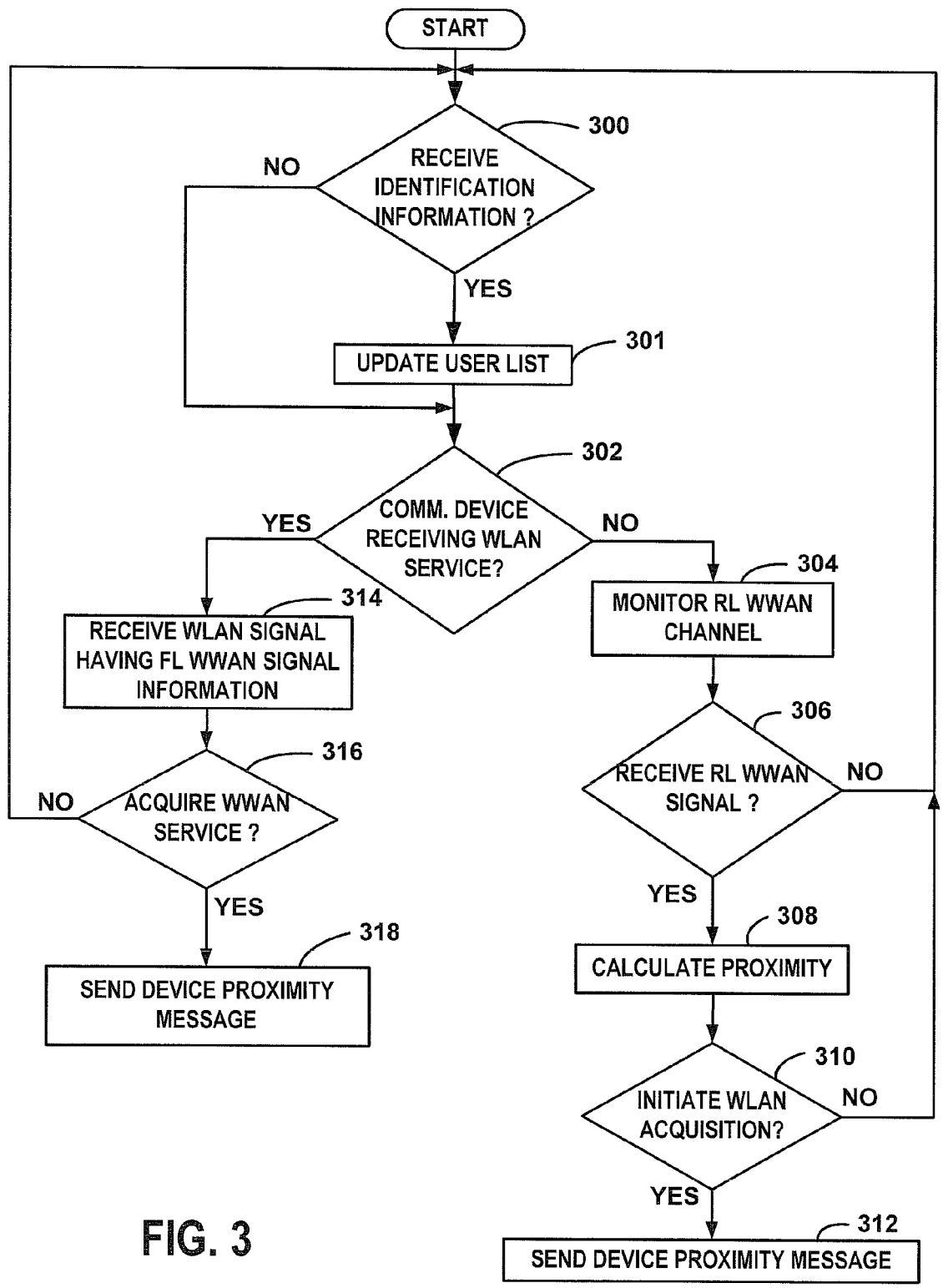
FIG. 3 is a flow chart of a method of managing wireless service to a multi-mode wireless communication device in accordance with the exemplary embodiment.

FIG. 3 is flow chart of a method of managing wireless service to a multi-mode wireless communication device 106 in accordance with the exemplary embodiment. The method may be performed by any combination of hardware, software and/or firmware. The order of the steps discussed below may be varied and one or more steps may be performed simultaneously in some circumstances. In the exemplary embodiment, the method is performed, at least in part, by executing code on the controller 204 in the access point 102.

At step 300, it is determined whether identification information 119 has been received from the WWAN system. The access point at least periodically monitors data and control signals received through the access routed and/or the IP network 228 to determine if identification information 119 has been sent by the access gateway 230 of the WWAN communication system 104. If no identification information has been received the method continues at step 302. Otherwise, the method continues at step 301.

At step 301, the user list in the access point 102 is updated. The identification information 119, or other data based on the identification information 119 is added to the one or more records stored in the memory 206 that define the user list. In the exemplary embodiment, reverse link scheduling information is also received by the access point from the access gateway 230. The reverse link scheduling information is stored in memory 206 and associated with the identification information for the particular communication device 106.

At step 302, it is determined whether the communication device 106 is receiving WLAN service. If the communication device 106 is currently communicating with the access point 102, the method continues at step 314. Otherwise, the method continues at step 304. Accordingly, step 304 through step 312 are performed in the exemplary embodiment for a communication device 106 that is identified in the user list but is not currently receiving WLAN communication service from the access point 102. Step 314 through step 318 are performed when the communication device 106 is in communication with the access point 102. In some circumstances, steps 314-318 can be omitted.

At step 304, the WWAN reverse link (RL) channel is monitored. In the exemplary embodiment, the WWAN RL receiver 220 is tuned to decode any WWAN RL signals 222 transmitted from any of the communication devices 106 in the user list. The reverse link scheduling information enables more efficient RL monitoring. The access point 102 may detect communication devices 106 that are not in the user list but will not be able to decode the signals without identification information. In some circumstances, however, the WWAN RL receiver 220 may be configured to monitor all RL channels.

At step 306, it is determined whether the WWAN RL receiver 220 has received a WWAN RL signal 202. In the exemplary embodiment, the controller 204 determines whether a WWAN RL signal 202 has been received from a communication device listed in the user list. If a WWAN RL signal has been received, the method continues at step 308. Otherwise, the method returns to step 300 to continue monitoring the data received from the WWAN system 104.

At step 308, the proximity of the communication device 106 to the access point 102 is calculated. The proximity calculation may be based on any number of parameters or characteristics of the received WWAN RL signal as well as other factors. Examples of suitable parameters include parameters related to signal power level and a timing offset between a transmission and reception times. Other related factors may include transmission power level, location of one or more WWAN base stations and information extracted from WWAN RL signals and WWAN FL signals such as time stamps, power level indicators, and power control indicators. In some circumstances, the proximity is based only on a detection of the WWAN RL signal. The particular factors and calculation techniques depend on the type of WWAN communication system 104. An exemplary technique suitable for an OFDM based system IEEE 802.16 is discussed with reference to FIG. 5 below.

At step 310, it is determined whether the communication device 106 should acquire WLAN service. Although the determination may be based solely on the proximity of the communication device 106 to the access point 102, other factors may be considered in some circumstances. Examples of other factors include the capacity of the access point 102, the required bandwidth required by the communication device, the current cost of the WWAN service and the estimated motion of the communication device. If the controller determines that WLAN service should be acquired, the method continues at step 312, otherwise, the method returns to step 304. In some circumstances, this step may be omitted and the access point 102 may send proximity information to the WWAN with other information to allow the WWAN system 104 to make the determination of whether a communication device 106 should acquire WLAN service from the access point 102.

At step 312, a device proximity message 118 is sent to the WWAN communication system 104. In the exemplary embodiment, the message 118 is transmitted by the WWAN interface 120 through either the IP network 228 or through the access router 226 to the WWAN communication system 104. As discussed above, the device proximity message 118 at least indicates that the communication device 106 may be within range of the access point 102 although other indications and information may be included. The access point 102 may transmit the message using other techniques. In some circumstances, for example, the message 118 may be transmitted through a WWAN RL channel to the base station 108. The WWAN system 104 may initiate acquisition, of the WLAN service, initiate searching for WLAN service or may initiate a handoff to the access point 102. In the exemplary embodiment, the WWAN system 104 determines, based on the device proximity message, that the communication device 106 is within a WLAN service area provided by access point 102.

At step 314, a WLAN signal that contains FL WWAN signal information is received. In the exemplary embodiment, a WWAN status message is transmitted by the communication device 106 to the access point 102. The WWAN status message may include WWAN FL power level information or other information related to the WWAN FL signals received at the communication device.

At step 316, it is determined whether WWAN service should be acquired. The controller 204 may evaluate any of number of factors or combinations of factors to determine whether WWAN service should be acquired for the communication device where at least one of the factors is base on the WWAN status message received from the communication device 106. Examples of factors include WWAN FL power level, WWAN signal to noise ratio, WLAN RL power level, WLAN FL power level, level of service, and service costs. If the controller 204 determines that WWAN service should be acquired, a device proximity message is sent to the WWAN system at step 318. Otherwise, the method returns to step 300.

At step 318, a device proximity message is sent to the WWAN system 104 indicating that the communication device 106 is positioned at a local where WLAN service is marginal and where WWAN service may provide increased performance. In response, the WWAN system 104 evaluates the circumstances and initiates a handoff or instructs the communication device 106 to acquire WWAN service. In some circumstances, the access point 106 may instruct the communication device 106 to acquire WWAN service by sending a message to the communication device 106. In other circumstances, the access point 102 may instruct the communication device 106 to evaluate services and acquire WWAN service is warranted.

As mentioned above, steps 314, 316, and 318 may be omitted in some circumstances. For example, the status of WWAN service may be determined or received at the WWAN system 104 and forwarded to the access point through the access gateway 230. In other situations, the WWAN system 104 may make all WWAN service acquisition determinations and the access point is not required to receive any WWAN service status information.

Figure 4:
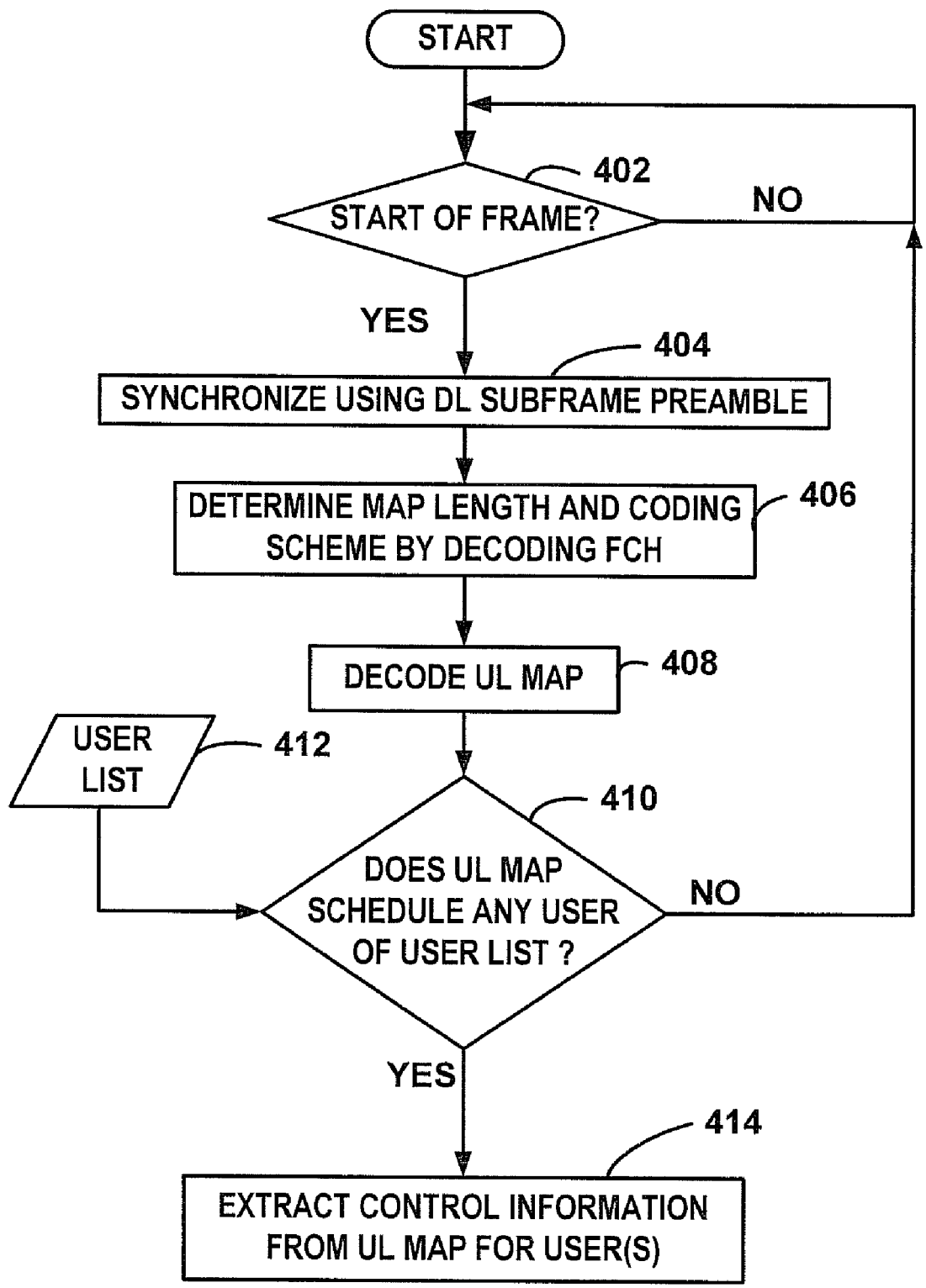
FIG. 4 is a flow chart of a method of monitoring a WWAN FL channel at an access point where the WWAN system operates in accordance with in accordance with the IEEE 802.16 standard.

FIG. 4 is a flow chart of a method of monitoring a WWAN FL channel at an access point 102 where the WWAN system 104 operates in accordance with OFDM techniques. The exemplary method operates within an OFDMA system that functions in accordance with IEEE 802.16(e) protocols. The method described with reference to FIG. 4 is an example of suitable technique for acquiring information that allows the access point 102 to monitor the reverse link WWAN channels. The method described with reference to FIG. 4 may not be performed in implementations where all identification information and reverse link scheduling information is sent to the access points through an access gateway 230. In some situations, scheduling and identification information may be obtained by the access point through the WWAN FL signals and through the access gateway 230. As discussed with reference to FIG. 4 and FIG. 5, the forward link (FL) WWAN signal and WWAN FL channel are referred to as downlink (DL) signals and downlink (DL) channels and correspond to communications from an OFDMA base station, sometimes referred to as an access node (AN), to the communication device 106. As discussed with reference to FIG. 4 and FIG. 5, reverse link (RL) WWAN signals and WWAN RL channels are referred to as uplink (UL) signals and uplink (UL) channels and correspond to communications from the communication device 106 to the OFDMA base station. As is known, IEEE 802.16(e) standards (WiMax) can operate in a time division duplex (TDD) or frequency division duplex (FDD) scheme. In the exemplary embodiment, the system operates in TDD mode. Those skilled in the art will readily apply the teachings herein to implement the system in FDD mode. In a TDD mode, each frame is split into a downlink (DL) sub-frame and an uplink (UL) sub-frame. The DL sub-frame includes a preamble, control information and other broadcast messages and packets. The control information includes DL and UL MAPs. Each communication device 106 is assigned a specific set of frequencies for receiving respective data packets. Each communication device 106 is also assigned a set of frequencies for transmitting in the UL.

At step 402, the controller 202 locates the start of a DL frame. When the start of the frame is found, the method continues at step 404. Otherwise, the step 402 is repeated.

At step 404, the WWAN FL receiver 226 acquires and synchronizes to the incoming signal using the DL sub-frame preamble. The WWAN FL receiver 226, therefore, performs the functions of a DL receiver in the exemplary method.

At step 406, the Frame Control Header (FCH) is decoded to determine the DL data burst length and coding scheme. In the exemplary method, the FCH burst is followed by the preamble. In networks operating in accordance with IEEE 802.16 standards, an uplink map (UL MAP) is a Medium Access Control (MAC) message that defines burst start times and frequencies on the UL channels for each communication device 106.

At step 408, the UL MAP is decoded. Accordingly, the received DL signals provides information in the UL MAP that allows the controller 202 to determine the timing of UL signals and carrier frequencies assigned to the communication device 106. In addition, the UL MAP includes user identification (ID) information corresponding to communication devices that are receiving the DL signals from the base station (access node).

At step 410, it is determined whether one or more of the communication devices listed in a user list 412 at the access point 102 are contained in the UL MAP. The user list 412 includes identification information that uniquely identifies communication devices that are supported by the access point 102. For example, the IEEE 802.16(e) standard uses manufacturer-issued X.509 digital certificates to identify devices. The user list 412 is typically programmed at the time of installation of the access point 102 and may be modified to add or remove user IDs. The users may be members of a household that reside where the access point 102 is installed. If no user IDs in the user list are contained in the UL MAP, the method returns to step 402. Otherwise, the method continues at step 414. In some circumstances, the UL MAP may not contain an explicit identification number and may include indirect identification information that can be used to determine the identity of the communication device 106.

At step 414, the control information for all of identified users is extracted from the UL MAP or other control messages. The control information is the transmission RL control information that includes a RL transmission power level and a RL transmission time for the WWAN RL signals transmitted by the communication devices 106. The timing information corresponding to the identified communication device is extracted from the decoded UL MAP and stored in memory.

Figure 5:
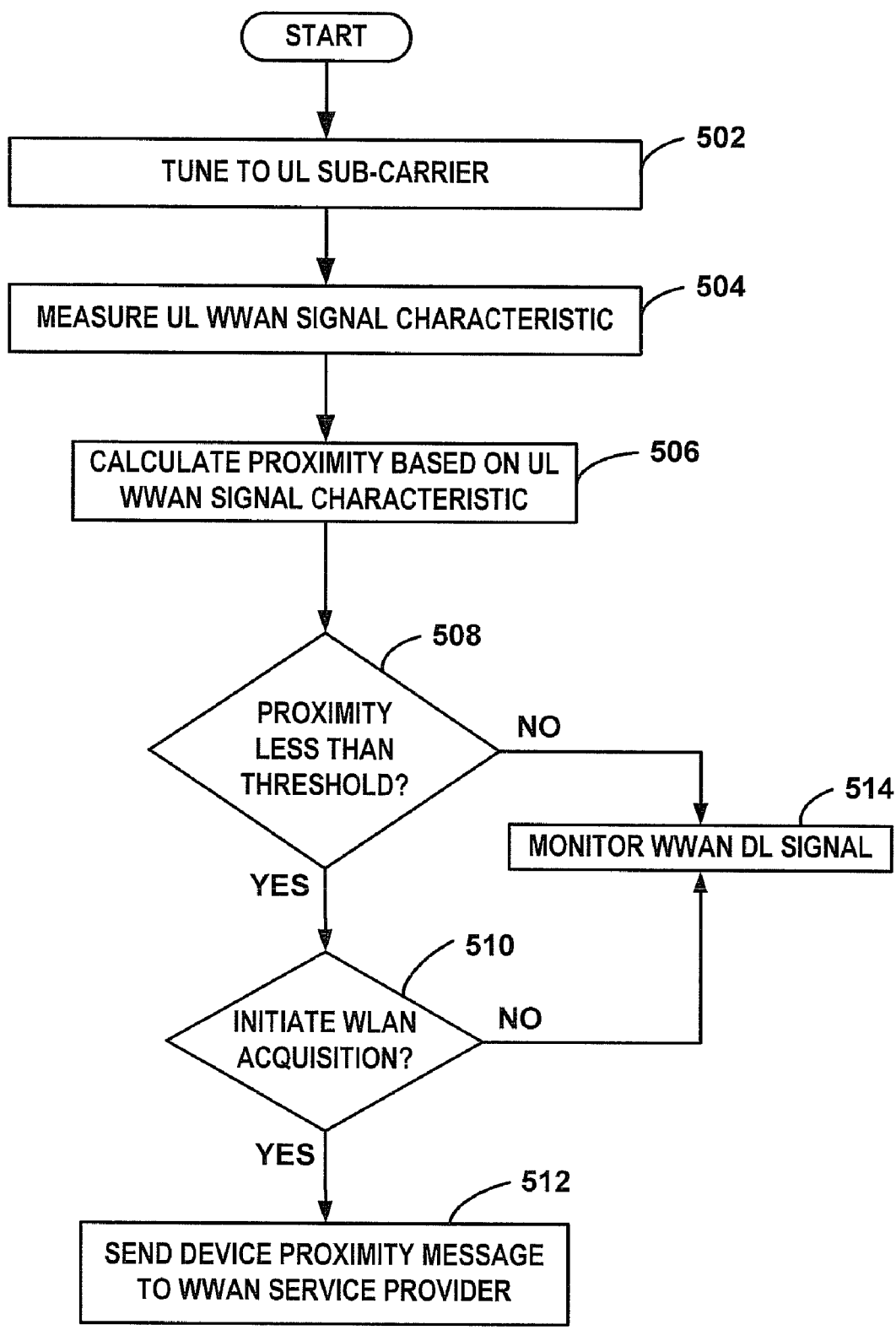
FIG. 5 is a flow chart of an exemplary method of managing wireless resources where the WWAN system operates in accordance with the IEEE 802.16 standard.

FIG. 5 is a flow chart of an exemplary method of managing wireless resources where the WWAN system 104 operates in accordance with OFDMA based system such as IEEE 802.16 (e). The exemplary method is performed by the access point 102 and includes monitoring a WWAN RL channel and initiating an acquisition of WLAN service to the communication device 106 based on a received WWAN RL signal. As explained above, the WWAN RL signals and WWAN RL channels are referred to as UL signals and UL channels with reference to FIG. 5. Using the information determined with the method discussed with reference to FIG. 4, or the information received from the access gateway 230, the access point 102 monitors the UL WWAN channel and sends a WLAN acquisition message if certain criteria met. Accordingly, steps 502-514 provide an exemplary technique for performing steps 304-312 discussed with reference to FIG. 3 above.

At step 502, the WWAN receiver 216 is tuned to the UL sub-carrier frequency indicated by the UL map. The UL sub-carrier frequency received from the access gateway or extracted in step 414 is used to tune the WWAN RL receiver 224. In some situations, a single receiver may be tuned to both uplink and downlink frequencies. In the exemplary embodiment, the receiver 216 can simultaneously receive UL and DL signals.

At step 504, the characteristics of the received UL WWAN signal is measured. In the exemplary embodiment, the controller 202 determines the power level and the reception time of the received UL signal. In some situations only the reception time or the power level is determined. Using known techniques, the power of the received UL WWAN signal is measured and stored in memory. The reception time is determined relative to the system time and stored in memory. Other signal characteristics may be determined in some circumstances where the signal characteristics provide information regarding the proximity of the communication device 106 to the access point 102. In the exemplary embodiment, the identification information is used to identify the communication device 106 only and not to decode the signals in order to minimize cost. In some implementations, however, the identification information may be used to decode the WWAN RL signals.

At step 506, the controller 106 calculates the proximity of the communication device 106 transmitting the UL signal to the access point 102. Based on the characteristics of the UL signal, the controller 204 determines the distance from the access point 102 to the communication device 106. Using the transmission time of the WWAN UL signal determined from the UL MAP and reception time, the controller 204 calculates a propagation time of the signal. The propagation attenuation of the signals is determined by calculation the difference between the transmission power and the reception power. Using either or both of the propagation parameters, the controller 204 calculates the proximity of the communication device 106 to the access point 102. For example, the distance may be determined by multiplying the propagation time by the speed of light. The distance may also be calculated by comparing the propagation loss to a known propagation loss per distance function for the antennas. The distance values may be averaged or otherwise processed to determine the proximity.

At step 508, it is determined whether the proximity of the communication device 106 to the access point 102 is less than a threshold. The threshold may be based on any of several factors and may be dynamic or static. In the exemplary embodiment, the threshold is the maximum distance between the communication device 106 and the access point 102 where the access point 102 can provide WLAN service to the communication device. If the proximity is less than the threshold, the method continues at step 510. Otherwise, the method continues to step 514 where the procedure includes returning to step 402 of FIG. 4 in situations where the method of FIG. 4 is performed.

At step 510, it is determined whether the communication device 106 should acquire WLAN service. Although the determination may be based solely on the proximity of the communication device 106 to the access point 102, other factors may be considered in some circumstances. Examples of other factors include the capacity of the access point 102, the required bandwidth required by the communication device 106, the current cost of the WWAN service and the estimated motion of the communication device 106. If the controller determines that WLAN service should be acquired, the method continues at step 512, otherwise, the method returns to step 514. In some situations, this step can be omitted and the access point 102 may send proximity information to the WWAN system 104 where the WWAN system 104 determines whether the communication device 106 should acquire WLAN service.

At step 512, a device proximity message 118 is sent to the WWAN service provider. The message includes information that when interpreted by the WWAN results in instruction from the WWAN system 104 to the communication device 106 resulting in the search for the access point 102. In some circumstances the acquisition may result in a handoff from the WWAN system to the WLAN system. In other circumstances, service may be maintained from the WWAN system 104 or the communication device 106 may remain registered on the WWAN system 104 although no user data is transmitted over the WWAN communication channels. Accordingly, step 510 provides an exemplary technique of performing step 312 where the WWAN communication system 104 operates in accordance with IEEE 802.16(e) standards.

Figure 6:
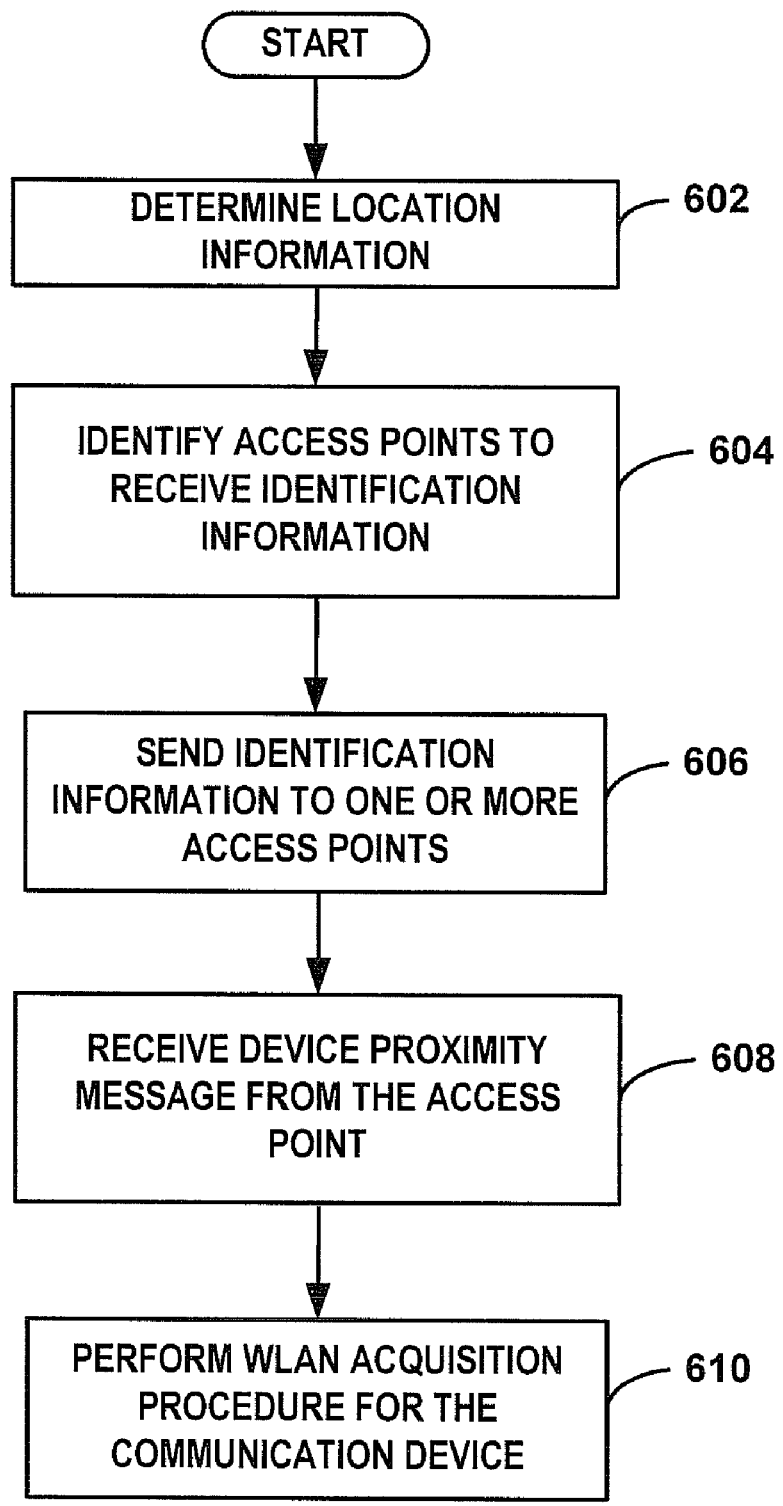
FIG. 6 is a flow chart of a method of managing wireless service performed in a communication system arrangement.

FIG. 6 is a flow chart of a method of managing wireless service performed in a communication system arrangement.

At step 602, the WWAN communication system 104 determines location information. The location information of one or mode communication devices is determined by the controller 232. As explained above, the controller 232 may include or may have access to a PDE or Location Server. Further, the controller may be distributed through the core network. Accordingly, the components of the controller 232 may not be collocated in many situations. As explained above, the location information may be based on the service area of the base station or base station sector communicating with the communication device 106. The location information may also be based on information transmitted by the communication device 106 such as GPS data. In the exemplary embodiment, the location information is derived from information transmitted by the communication device 106 and information based on the identification of the base station or base station sector that is providing WWAN service to the communication device 106, At step 604, the controller 232 identifies the access points 102 that will receive an identification information message. In the exemplary embodiment, the access points 106 determined to have WLAN service areas at least partially within a geographical area 117 corresponding to the communication device locations are selected to receive identification information of those communication device within or proximate the geographical area 117. The geographical area 117 may depend on the method of acquiring location information that indicates the geographical locations of the communication devices 106. For example, where the location information is derived by identifying a base station or a base station sector that is providing WWAN service to the communication device 106, the geographical coverage area 117 is based on a base station sector coverage area or base station sector coverage area. Where the location information is obtained by information sent by the communication device 106, the geographical area 117 is determined based on the location information provided. For example, if the communication device 106 provides location information derived from global positioning system (GPS) coordinates obtained by the communication device 106, the geographical area 117 may include a circle having the location of the communication device 106 as the center. Other techniques may be used by the WWAN system 104 to determine the geographical area 117 that contains the communication device 106. For example, antenna beam forming, smart antenna, or triangulation techniques may be used to estimate the geographical area 117 containing a communication device 106.

At step 606, the identification information is sent to one or more access points 102. The controller 232 sends data to each access point 102 that allows the access point to identify the communication devices that may enter the WLAN service area. The identification information may includes an ESN, serial number, or any other data that provides adequate information for the access point to identify the communication device and receive WWAN RL signals transmitted from the communication device 106. The WWAN communication system, therefore, is configured to send identification information identifying a local multi-mode wireless communication device located within or proximate a geographical area to one or more access points providing wireless local area network (WLAN) service within WLAN service areas at least partially within the geographical area; and At step 608, the WWAN communication system 104 receives a device proximity message from the access point(s). The device proximity message identifies a communication device that is within the WLAN service area of the access point 102. In the exemplary embodiment, the device proximity message is received through the access gateway 230.

At step 610, the controller 232 performs a WLAN acquisition procedure for the communication device 106. In some circumstances, the WWAN communication system 104 may make a determination whether the WLAN acquisition procedure should be performed. Although, the communication device 106 is within the WLAN service of an access point, other factors may require that the communication device 106 remain on the WWAN service. The WLAN acquisition procedure may include the transmission of an instruction to the communication device indicating the communication device should search for WLAN service.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An access point comprising:
   a wireless local area network (WLAN) interface configured to provide WLAN service to at least one multi-mode wireless communication device within a WLAN service area;
   a network interface configured to receive, from a wireless wide area network (WWAN) communication system, identification information identifying a local multi-mode wireless communication device positioned proximate a geographical region comprising at least a portion of the WLAN service area;
   a wireless wide area network (WWAN) receiver configured to receive a reverse link WWAN signal transmitted by the local multi-mode wireless communication device; and
   a controller configured to determine a proximity of the local multi-mode wireless communication device to the access point based on the WWAN reverse link signal, the network interface configured to send, to the WWAN communication system, a device proximity message in accordance with the proximity.

2. The access point of claim 1, wherein the device proximity message comprises a request selected from a group consisting of a WLAN service request to establish the WLAN service, a WWAN service termination request to terminate WWAN service, and a maintain WWAN service request to maintain WWAN service.

3. The access point of claim 1, wherein the controller is further configured to generate the proximity message in response to determining that the proximity is below a WLAN proximity threshold.

4. The access point of claim 1, wherein the controller is further configured to generate the device proximity message based on a received power level of the WWAN signal.

5. The access point of claim 4, wherein the WWAN interface is further configured to receive reverse link scheduling information.

6. The access point of claim 5, where the reverse link scheduling information is recede from an access gateway and comprises frequency information and timing information.

7. The access point of claim 6, where the reverse link scheduling information comprises a carrier frequency, a sub-carrier frequency, and a reverse link time slot identifier associated with the local multi-mode wireless communication device.

8. The access point of claim 1, wherein the identification information is determined by the WWAN communication system based on location information transmitted by the local multi-mode wireless communication device.

9. The access point of claim 8, wherein location information is global positioning satellite (GPS) data.

10. The access point of claim 1, wherein the identification information is determined by the WWAN communication system based on location information determined by the WWAN communication system.

11. The access point of claim 10, wherein the location information is determined based on a WWAN service area corresponding to the geographical location.

12. The access point of claim 11, wherein the WWAN service area is a WWAN communication cell.

13. The access point of claim 11, wherein the WWAN service area is a sector of a WWAN communication cell.

14. A communication system comprising:
 a wireless wide area network (WWAN) communication system configured to send identification information identifying a local multi-mode wireless communication device located within a geographical area to one or more access points providing wireless local area network (WLAN) service within WLAN service areas at least partially within the geographical area; and
 a local access point, of the one or more access points, configured to receive the identification information and to send a proximity message to the WWAN communication system based on a reverse link (RL) WWAN signal received from the local multi-mode wireless communication device.

15. The communication system of claim 14, wherein the proximity message indicates that the local multi-mode wireless communication device is within a local WLAN service area provided by the local access point.

16. The communication system of claim 14, wherein the WWAN communication system comprises a WWAN controller configured to determine the identification information based on location information.

17. The communication system of claim 16, wherein the WWAN communication system further comprises a base station configured to receive a location information signal from the local multi-mode wireless communication device, the WWAN controller identifying the one or more access points based on the location information.

18. The communication system of claim 16, wherein the WWAN controller determines the location information based on at least one parameter measured at a base station.

19. The communication system of claim 16, wherein the WWAN controller wherein the at least one parameter is a WWAN service area provided by a base station, the WWAN service area corresponding to the geographical area.

20. The communication system of claim 19, WWAN service area is a sector of communication cell.

21. A method for managing wireless local area network service comprising:
 receiving, at an access point configured to provide wireless local area network (WLAN) service within a WLAN service area and from a wireless wide area network (WWAN) communication system, identification information identifying a local multi-mode wireless communication device positioned proximate a geographical region comprising at least a portion of a WLAN service area;
 receiving, at the access point, a reverse link (RL) WWAN signal transmitted by the local multi-mode wireless communication device;
 determining a proximity of the local multi-mode wireless communication device to the access point based on the WWAN uplink signal, and
 sending, to the WWAN communication system, a device proximity message in accordance with the proximity.

22. The method of claim 21, further comprising receiving reverse link scheduling information from an access gateway.

23. The method of claim 21, further comprising generating the device proximity message in response to determining that the proximity is below a WLAN proximity threshold.

* * * * *